March 24, 1953 R. W. HALE 2,632,276
FISH LURE

Filed June 4, 1951 2 SHEETS—SHEET 1

Inventor
Roger W. Hale
by Martin Kirkpatrick
Attorney

March 24, 1953     R. W. HALE     2,632,276
FISH LURE
Filed June 4, 1951     2 SHEETS—SHEET 2
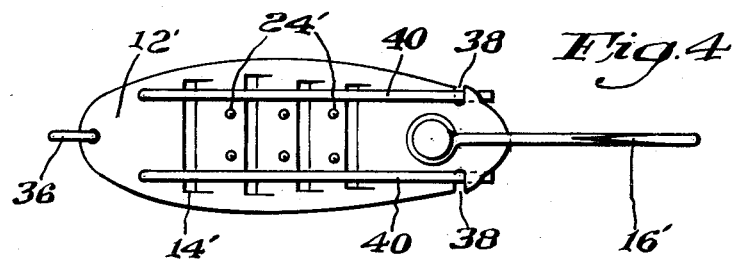
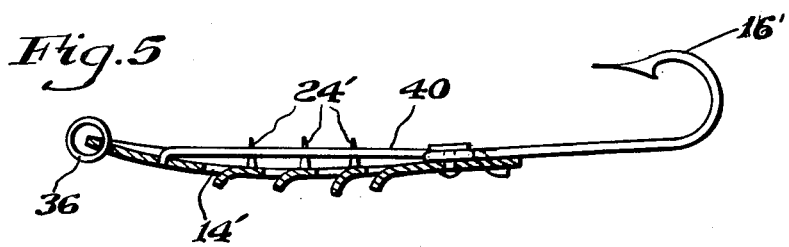
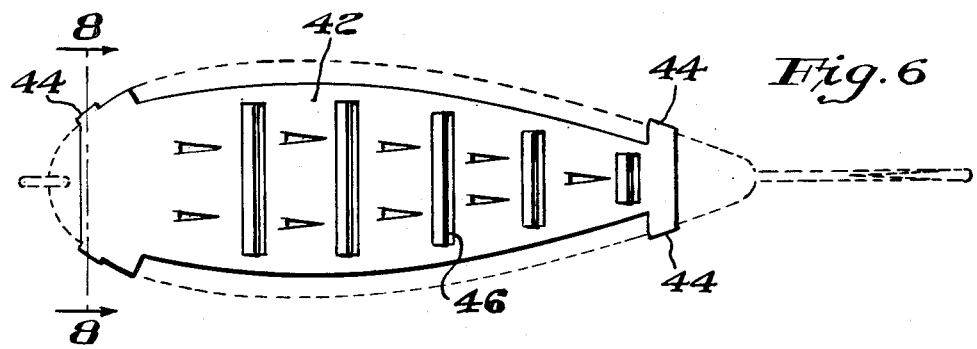
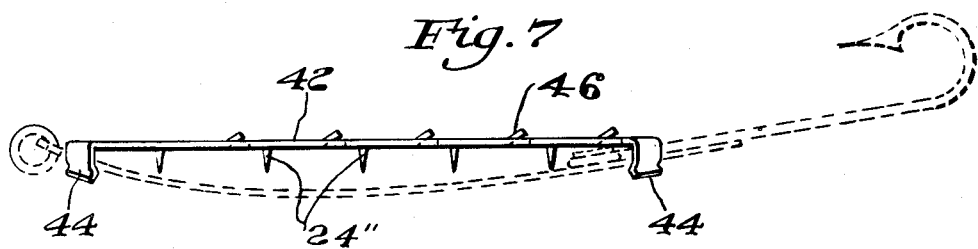
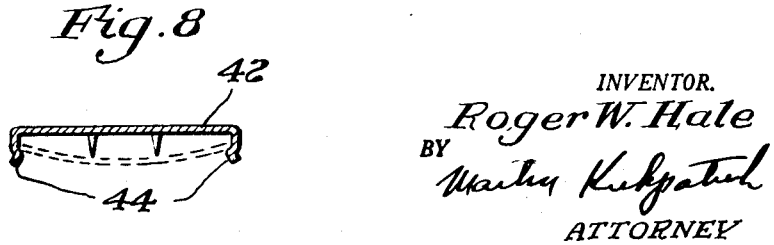
INVENTOR.
Roger W. Hale
BY
ATTORNEY Patented Mar. 24, 1953

2,632,276

UNITED STATES PATENT OFFICE 2,632,276

FISH LURE

Roger W. Hale, Riverside, R. I.

Application June 4, 1951, Serial No. 229,729

11 Claims. (Cl. 43—42.06)

This invention relates to fish lures and more particularly to a novel fish lure of the spoon type which is adapted to retain artificial bait in such manner as to cause the odors and minute particles of the bait to disseminate therefrom so as to attract fish by their senses of smell and taste, thereby causing the fish to strike at the spoon without permitting them to actually bite the bait material.

One of the principal objects of the present invention is to provide means within a fishing lure of the spoon type adapted to retain a bait material for causing a controlled amount of water to pass through and over the bait retained in said lure to extract odors and minute particles therefrom and then pass out of the artificial lure, thus creating a trail of bait laden water through which the lure has passed, which trail will attract such fish as pass through or near it to the spoon.

Another object of the present invention is to provide an artificial fishing lure which will combine the well known advantages of the spoon type of lure, such as its violent wriggling action when pulled through the water and its resulting ability to flash reflected light over a large area of water to attract fish from relatively great distances, with the equally well known advantages of natural or artificial bait, to which fish are attracted primarily by their senses of smell and taste.

Still another object of the present invention is to provide a simple inexpensive device for modifying existing, commercially available fishing spoons to produce the novel bait-retaining spoon lure of my invention.

It is a feature of my novel bait-retaining spoon that it may be quickly and easily opened and closed, without the use of tools, to allow replacement or change of the bait retained therein, yet it cannot become accidentally separated to allow a fish caught thereon to escape, nor will it come apart when it is being cast.

For the purpose of fully explaining further objects and features of preferred embodiments of my invention, reference is made to the following drawings, in which, Fig. 1 is a plan view of a bait-retaining fishing spoon constructed in accordance with my invention;

Fig. 4 is a plan view of a modified form of a bait-retaining fishing spoon of my invention;

Fig. 5 is a longitudinal sectional view of the spoon of Fig. 4;

Fig. 6 is a plan view of a second modified form of a bait-retaining fishing spoon of my invention;

Fig. 7 is a side elevational view of the spoon of Fig. 6; and

Fig. 8 is a transverse sectional view of the spoon taken on the line 8—8 of Fig. 6.

Figure 1:
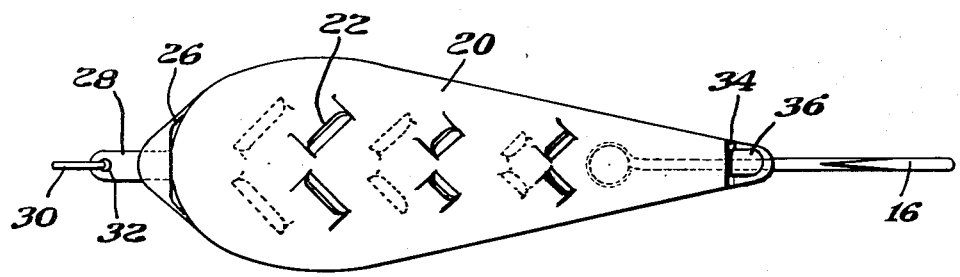
Figure 2:
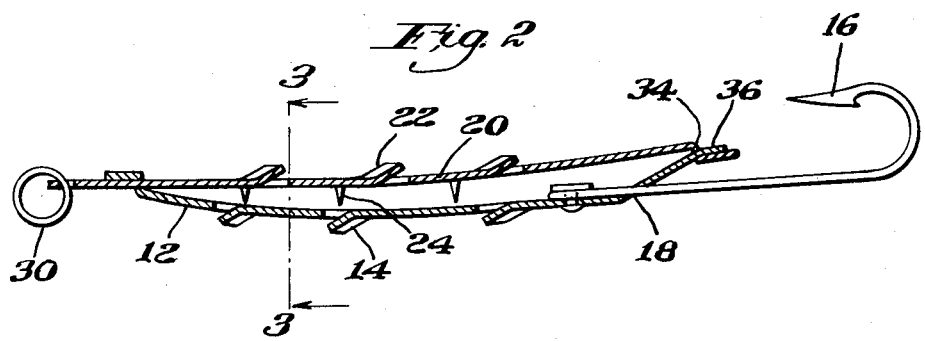
Fig. 2 is a longitudinal sectional view of the spoon of Fig. 1.
Figure 3:
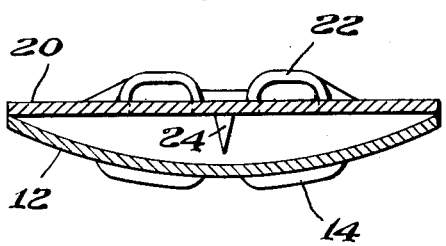
Fig. 3 is an enlarged transverse sectional view taken along line 3—3 of Fig. 2, looking in the direction of the arrows.

Referring to Figs. 1, 2 and 3, the bait-retaining fishing lure of my invention includes a true spoon 12 with a dished blade having opposing surfaces shaped in complementary curves, one of said surfaces being concave and the other convex and both of said surfaces being smoothly curved over their major portion—all as shown in the drawings—without either reverse curved or flat portions of any substantial extent sufficient to affect the darting erratic true spoon action. Preferably, such spoon 12 has a generally rounded forward portion and a tapering, upswept rear portion. The spoon 12 may be of any suitable material, though I prefer to use sheet metal material, plated or otherwise finished to increase its reflection and corrosion resistance. The convex bottom surface of the spoon has a number of apertures therethrough into said bait-retaining recess, preferably in the form of scoops 14 facing toward the front so that when the spoon is pulled through the water a controlled amount of water will pass through said spoon from the convex outer to the inner surface thereof. However, since the surface of a spoon is at an angle to the direction of the spoon's travel through the water, simple apertures will operate as scoops on at least one surface of said lure. A hook 16 is fastened on the inside of said spoon-shaped body 12 by any suitable means, the shank of said hook extending through a slot 18 near the rear of the spoon 12 so that the shank and point of the hook extend rearwardly from the rear portion of the spoon.

In order to retain bait adjacent the concave surface of the spoon 12, I provide a cover 20 for said spoon, said cover being preferably slightly concave and swept upward somewhat at the rear of the spoon to maintain the shape of a true spoon as nearly as possible, since, if the upper surface of said cover is convex in any appreciable degree, the spoon will lose its desired erratic wriggling motion when pulled through the water, whereas if the upper surface of the cover is too concave, the desired bait-retaining recess will be reduced in size. The cover 20 is adapted to fit over either side of spoon 12, thus a bait-retaining recess is formed between said cover and said spoon 12. Rearwardly facing scoops 22 are provided on the upper surface of said cover 20, said scoops 22, in conjunction with scoops 14 on spoon 12, providing a controlled flow of water through the bait-retaining recess when the lure is pulled through the water. Skewers 24 may be provided on said cover 20 extending downwardly therefrom into the bait-retaining recess, such skewers serving more effectively to retain certain kinds of bait in the recess between the cover 20 and the spoon 12, since, in utilizing baits of soft consistency, such as mussels, clam bellies, etc., in the absence of skewers 24 said baits would be slung into a solidly packed mass in the rear of the bait-retaining recess, due to the centrifugal force exerted upon said baits as the lure goes through the tortuous gyrations of spinning, diving, etc. as it is drawn through the water. Such a condition would greatly reduce the effectiveness of the lure as water could not efficiently circulate through and around the bait material packed in the rear of the compartment. By the use of skewers, however, I have found that such bait is retained in proper position along the length of the bait recess and in proper relation to the flow of water, thereby presenting a greater bait surface area to the circulating water, and intensifying the degree of saturation of the exit water with bait odors and minute bait particles.

It is preferred that the spoon 12 and its cover 20 be held together so that they may be opened to permit the replacement or change of bait held in the recess therebetween and yet be at all times engaged so that the cover 20 cannot become detached from the spoon 12 and the hook 16.

To this end I have provided a slot 26 at the forward end of spoon 12 through which slot a tab 28 on cover 20 extends; said tab being prevented from completely coming out of said slot by a stop consisting of ring 30 in hole 32 on tab 28, the ring 30 also serving to provide a means for attaching a line to the lure. The rear end of cover 20 is provided with a similar slot 34 adapted to retain a tab 36 on the rear end of spoon 12, the tab 36 being shorter than the tab 28. The distance between the hole 32 on tab 28 and forward portion of the spoon 12 is great enough to allow the spoon 12 to be moved forward with relation to cover 20 to release the tab 36 from the slot 34, but the ring 30 will stop such movement before the longer tab 28 is released, tab 28 thus being at all times retained in its slot 26. Thus I have provided an extremely simple and effective means for opening the cover 20 and spoon 12 so that the bait within the recess may be replaced or changed, and such means requires the use of no tools whatsoever. Furthermore, by the provision of ring 30 at the forward end of tab 28, the cover 20 and spoon 12 are at all times prevented from becoming completely disengaged; thus should the spoon open because of being cast or because of the struggles of a fish on the hook 16, the cover 20 and the spoon 12 would not become disengaged. Of course, rearward movement of spoon 12 with relation to cover 20 is prevented by the forward edge of cover 20 behind tab 28, so that a rearward pull on the hook 16, even though the cover and spoon were disengaged at tab 36 and slot 34, would not cause the spoon and cover to come apart.

Referring to Figs. 4 and 5 a much simplified form of the fishing spoon of my invention is shown. It includes a spoon 12' having a number of apertures or scoops 14' facing toward the front of said spoon, skewers 24' extending upwardly from the concave inner surface of said spoon and a hook 16' fastened on the inside of said spoon by any suitable means, the shank of said hook extending beyond the rear of said spoon. A ring 36 is provided on said spoon 12' at the forward portion of said spoon to enable a line to be attached thereto. In order to retain bait adjacent the concave surface of said spoon over scoops 14' and skewers 24', the spoon 12' is provided with a pair of rearwardly extending spring wires 40 attached to the spoon 12' at the forward portion thereof, said wires being retained by a pair of transverse slots 38 in said spoon at the rear portion thereof. The slots 38 extend inwardly for a short distance from the outer margin of said spoon, and serve to retain wires 40 to hold bait between said wires and the inner surface of the spoon, and yet permit the easy removal of said wires so that the bait may be replaced or changed.

Referring to Figs. 6, 7 and 8, I have shown a simple inexpensive device for modifying existing commercially available fishing spoons to produce the bait-retaining spoon lure of my invention. In order to equip the usual fishing spoon with a bait-retaining recess having a controlled flow of water therethrough, I have provided a cover member 42 adapted to cooperate with such a spoon, said cover member being provided with spring tabs or clips 44 for holding it in position on said spoon, yet permitting its quick release therefrom.

The cover member 42 does not fit closely around the edges of the spoon, but is spaced therefrom to form an aperture between the spoon and said member 42 into the bait-retaining recess so that a controlled flow of water past bait retained in said spoon will be produced when the lure is moved through the water. Additional apertures having the form of rearwardly facing scoops 46 are preferably provided on cover member 42 to aid the controlled flow of water through the bait-retaining recess, while skewers 24" are provided to retain the bait in said recess as more fully explained above.

Thus it will be seen that I have provided a novel artificial fishing lure which combines the advantages of a spoon type of lure with those of bait, and at the same time is simple and economically manufactured. It will be seen by those skilled in the art that modifications of my invention other than those herein described may be made within the spirit of my invention and the scope of the appended claims.

I claim:

1. A bait-retaining fishing lure including a spoon with a dished blade having opposing surfaces shaped in complementary curves, one of said surfaces being concave and the other convex and both of said surfaces being smoothly curved over their major portion, said spoon having a plurality of scoops therethrough, and means for retaining bait adjacent the concave surface of said spoon, whereby said scoops cause water to pass over and past said bait when said spoon is moved through the water to provide a bait laden trail through the water in the wake of said lure to attract fish thereto.

2. A bait-retaining fishing lure including a spoon with a dished blade having opposing surfaces shaped in complementary curves, one of said surfaces being concave and the other convex and both of said surfaces being smoothly curved over their major portion, a cover for said spoon having a substantially non-convex upper surface adapted to cooperate with said spoon to form a bait-retaining recess, and said spoon having apertures into said bait-retaining recess whereby said apertures cause water to pass over and past said bait when said spoon is moved through the water to provide a bait laden trail through the water in the wake of said lure to attract fish thereto.

3. A bait-retaining fishing lure as claimed in claim 2 further including releasable attaching means having a first slot and a first tab at the forward end of said lure, and a second slot and a second tab at the rear end of said lure, one of said tabs being longer than the other of said tabs, and stop means preventing the release of said longer first tab from its slot whereby relative movement of said spoon and said cover will release said shorter second tab from its slot but said movement will be prevented by said stop means before said longer tab is released from its slot.

4. A spoon for fishing having one face concave, a cover member, quick release means for holding said cover member adjacent the concave face of said spoon to provide a bait-retaining recess between said cover member and the concave face of said spoon, and said spoon having apertures into said bait-retaining recess for providing a controlled flow of water through said recess whereby water is caused to pass over and past said bait when said spoon is moved through the water to provide a bait laden trail through the water in the wake of said lure to attract fish thereto.

5. A fishing lure having in combination, a spoon member concavo-convex in section longitudinally and transversely and a cover member over the major portion of said spoon, one of said members having struck out portions in its wall defining openings and deflecting walls, and means for detachably securing said cover to said spoon so as to provide a recess therebetween, one of said members having projections extending into said recess for retaining bait therein, said lure having line attaching means and a fishing hook secured thereto.

6. A fishing lure having in combination a spoon concavo-convex in section longitudinally and transversely and having in the wall thereof struck out portions defining openings and deflecting walls, and a cover over the major portion of one face of said spoon, said cover having struck out portions in its wall defining openings and deflecting walls, and means for detachably securing said cover to said spoon, said lure having line attaching means thereon and a fishing hook secured thereto.

7. A fishing lure as claimed in claim 6, further characterized in that said cover has a substantial portion positioned in spaced relation to said spoon to form a bait-retaining recess therebetween.

8. A fishing lure as claimed in claim 6, further including projections extending into said bait-retaining recess to retain bait in position within said recess.

9. A fishing lure as claimed in claim 6, wherein said struck out portions are symmetrically arranged in pairs, the openings defined by a pair of said struck out portions being substantially at an acute angle to each other.

10. A fishing line as claimed in claim 6, wherein said spoon is provided with a slot adjacent one end and a reduced projection at the other end, and wherein said cover has a projection at one end and a slot adjacent the opposite end, said slot and projection on the spoon coacting with said projection and slot respectively on the cover for detachably securing said spoon and cover together.

11. A fishing lure as claimed in claim 6, wherein said line attaching means include a projection on the cover.

ROGER W. HALE.

REFERENCES CITED

The following references are of record in the file of this patent:

UNITED STATES PATENTS

| Number | Name | Date |
|---|---|---|
| 1,211,384 | Barker | Jan. 9, 1917 |
| 1,513,235 | Frizzell | Oct. 28, 1924 |
| 1,558,249 | De Zeng | Oct. 20, 1925 |
| 1,913,362 | Catarau | June 13, 1933 |
| 1,993,990 | Catarau | Mar. 12, 1935 |
| 2,235,905 | Sherwood | Mar. 25, 1941 |
| 2,273,582 | Maire | Feb. 17, 1942 |
| 2,383,246 | Fiskaali | Aug. 21, 1945 |

FOREIGN PATENTS

| Number | Country | Date |
|---|---|---|
| 262,197 | Switzerland | Sept. 16, 1949 |